(12) United States Patent
Ullom et al.

(10) Patent No.: US 10,015,248 B1
(45) Date of Patent: Jul. 3, 2018

(54) SYNCRONIZING CHANGES TO STORED DATA AMONG MULTIPLE CLIENT DEVICES

(71) Applicant: Amazon Technologies, Inc., Seattle, WA (US)

(72) Inventors: Joshua Stephen Ullom, Seattle, WA (US); Christopher William Holt, Seattle, WA (US); Charles Joseph Beyer, Vashon, WA (US)

(73) Assignee: Amazon Technologies, Inc., Seattle, WA (US)

( * ) Notice: Subject to any disclaimer, the term of this patent is extended or adjusted under 35 U.S.C. 154(b) by 324 days.

(21) Appl. No.: 14/867,837

(22) Filed: Sep. 28, 2015

(51) Int. Cl.
*G06F 15/167* (2006.01)
*H04L 29/08* (2006.01)

(52) U.S. Cl.
CPC .............................. *H04L 67/1095* (2013.01)

(58) Field of Classification Search
CPC .................................................. H04L 67/1095
USPC .................... 709/200, 214, 203, 217, 226
See application file for complete search history.

(56) References Cited

U.S. PATENT DOCUMENTS

| | | | | |
|---|---|---|---|---|
| 7,370,064 | B2 * | 5/2008 | Yousefi'zadeh | .. G06F 17/30545 |
| 8,539,567 | B1 * | 9/2013 | Logue | ................. H04L 63/0884 |
| | | | | 709/223 |
| 8,635,373 | B1 * | 1/2014 | Supramaniam | ......... H04L 67/42 |
| | | | | 709/228 |
| 2008/0194276 | A1 * | 8/2008 | Lin | ..................... H04L 61/2015 |
| | | | | 455/466 |
| 2010/0228836 | A1 * | 9/2010 | Lehtovirta | .............. H04L 12/00 |
| | | | | 709/220 |
| 2016/0007083 | A1 * | 1/2016 | Gurha | .............. H04N 21/44222 |
| | | | | 725/13 |
| 2016/0070772 | A1 * | 3/2016 | Chatterjee | ........... H04L 41/5041 |
| | | | | 707/639 |

* cited by examiner

*Primary Examiner* — El Hadji Sall

(74) *Attorney, Agent, or Firm* — Lee & Hayes, PLLC

(57) ABSTRACT

A service provider network includes a host computer that communicates with a plurality of client devices associated with a user. In order to synchronize the plurality of client devices with respect to content stored within the service provider network, a synchronization service checks to determine if a checkpoint is present within the synchronization service when a request for updated content is received from one of the client devices. If no checkpoint is present in the synchronization service, then content within the user's account may have been updated. If a checkpoint is stored within the synchronization service, then the checkpoint in the synchronization service is compared with a checkpoint in the request. If the checkpoint in the synchronization service is older, content in the user's account has not been updated. If the checkpoint in the request is older, then content in the user's account may have been updated.

20 Claims, 7 Drawing Sheets

SYNCRONIZING CHANGES TO STORED DATA AMONG MULTIPLE CLIENT DEVICES

BACKGROUND

Many people now have multiple computing devices. For example, many people now have one or more smartphones (personal and/or business related), a tablet computing device, a laptop computing device and even a desktop computing device. A person with multiple computing devices can use the computing devices to store content within a data store of a service provider network that provides data storage services. For example, a person might take pictures with their smartphone and store the pictures within the data store of the service provider network. Later, the person may be using one of their other computing devices and may wish to access the photos with the other computing device. Thus, a person generally desires all of the content stored on their various computing devices to be synchronized with each other and up to date.

Generally, in order to synchronize the content stored on all of a user's computing devices, when a computing device is turned on and becomes active, the computing device will poll the service provider network for either all of the user's content that is stored within the data store of the service provider network. Alternatively, the computing device will simply poll the service provider network to provide any changed or updated content from the data store related to the person's account. While active, in order to remain up to date and synchronized, the computing devices will also periodically poll the service provider network for changed or updated content from the data store. Often, such polling can occur every 15 seconds, for example.

While such queries are generally minor, such queries from millions of users and their multiple computing devices can result in an extremely large number of queries. Thus, as can be seen, the aggregate of many minor queries can consume significant computing resources within a service provider network. Furthermore, often approximately half (or even more) of the queries to the service provider network data store indicate that no changes have occurred with respect to the user's account since the last query. As a result, significant computing resources are being consumed even though no changes have occurred.

The disclosure made herein is presented with respect to these and other considerations.

DETAILED DESCRIPTION

Figure 1A:
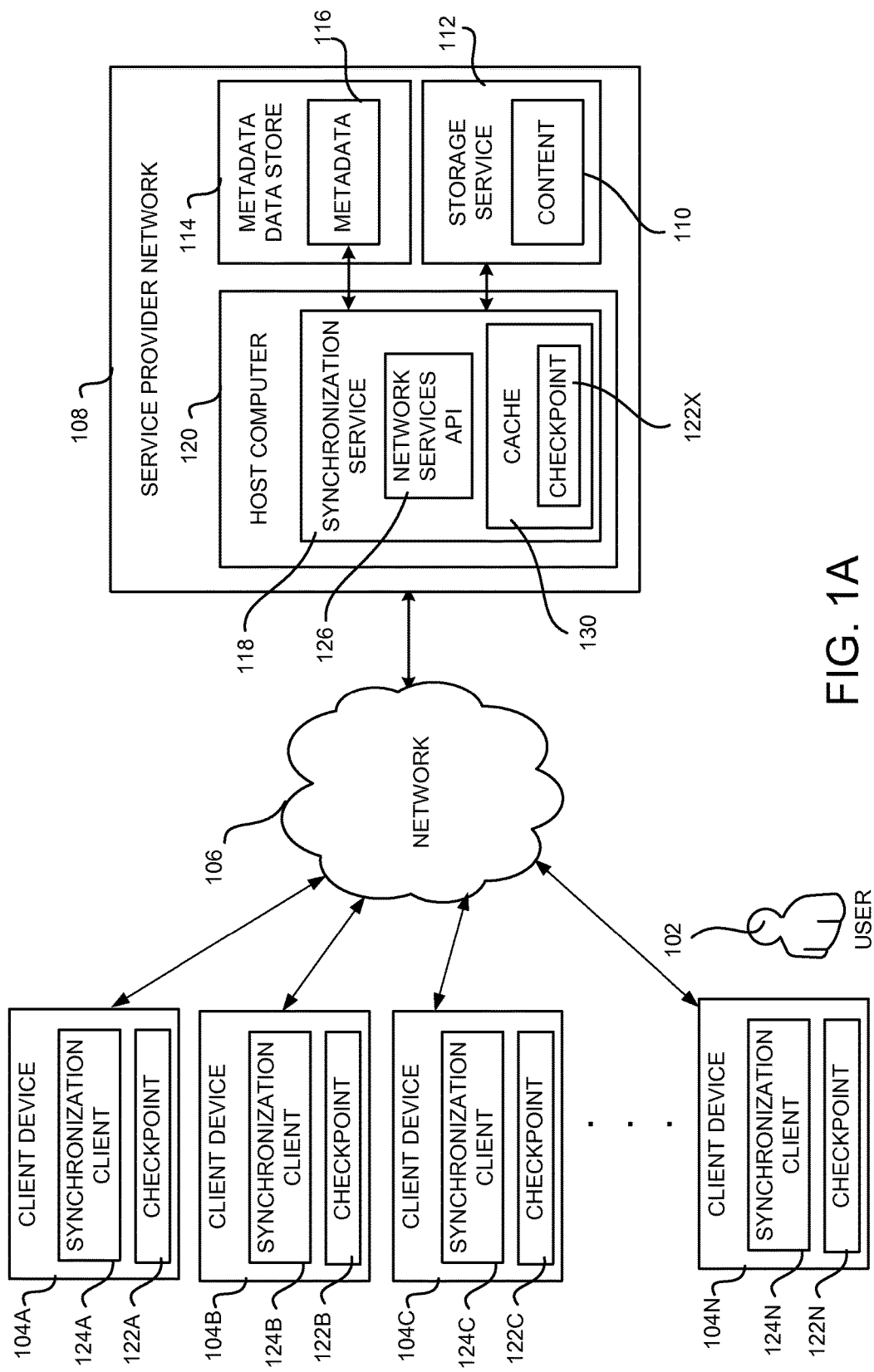
FIG. 1A is a network architecture diagram showing an overview of one illustrative mechanism described herein for managing changes to stored content files and synchronizing the changes among multiple client devices, according to one configuration disclosed herein.

The following detailed description is directed to technologies for managing changes to stored content files and synchronizing the changes among multiple client devices. Utilizing the technologies described herein, a service provider can provide data storage in a storage service within a service provider network for a user's multiple computing devices. The data can include, for example, data relating to content files such as pictures, documents, audio, video, etc. In configurations, the storage service is not included within a service provider network. Through the use of the technologies, the user's multiple computing devices can be synchronized with respect to data stored in the storage service while minimizing unnecessary queries to the storage service in the service provider network that stores the content of the user and/or unnecessary queries to a data store storing metadata related to the content stored in the storage service. Other technical benefits not specifically mentioned herein can result from an implementation of the disclosed technologies.

In accordance with configurations, a service provider network includes a storage service for storing content of a user in an account for the user. The content can be provided by and accessed by the user on multiple computing devices of the user. The content can also be provided by other sources.

In order to keep the service provider network from constantly querying the storage service in order to determine if content related to the user's account has been changed or updated, an oldest supplied checkpoint for which no changes have occurred in the user's account is cached by a synchronization service of the service provider network. The checkpoint is generally a timestamp indicating when a computing device has queried the service provider network for changes to the content. Every time a modification to the content stored in a user's account in the storage service occurs, the cached checkpoint for that account is invalidated, i.e., removed from the cache.

Whenever one of the user's computing devices requests changes to the content stored in the user's account in the storage service from the synchronization service, the request includes that computing device's most recent checkpoint. Thus, any checkpoint supplied in such a request that is more recent than the cached checkpoint indicates that there are no changes in the user's account (i.e., if the storage service were to be queried from the supplied checkpoint, there would be no changes). Accordingly, the query of the user's account in the storage service can be skipped by the synchronization service.

When no checkpoint is found in the cache for the user's account, then the synchronization service realizes that changes have been made to the user's account in the storage service. The computing device making the request for changed or updated content can then be supplied with the changed or updated content. In configurations, metadata related to the changed or updated content can be provided to the computing device that made the query so that the user can determine if indeed the changed or updated content is desired to be provided to the computing device that made the request. In configurations, the computing device that made the request can make the determination if indeed the changed or updated content is desired to be provided to the computing device. Once the computing device has been updated with the changed or updated content, a new checkpoint can be generated, stored in the cache and provided to the updated computing device.

When a request for changed or updated content is made and the checkpoint supplied with the request is older than the checkpoint within the cache, the synchronization service checks to see if any changes have been made to the content within the user's account during the time period between the two checkpoints. If changes have been made, the computing device making the request can receive the changed or updated content (or metadata relating to the changed or updated content to allow the user (or computing device) to decide if the changed or updated content is to be provided to the requesting computing device) and a new checkpoint is provided to the computing device. If no changes have been made to the content, then the older checkpoint is stored in the cache and provided back to the computing device making the request.

Thus, the synchronization service can skip querying the storage service based upon a checkpoint within the cache. This can reduce and even minimize the number of queries made by the synchronization service to the storage service within the service provider network. In other words, a front end computing system operating within the service provider network need not continually query back end computing systems (storage services) of the service provider network for every request for potentially changed or updated content. In addition, a user's multiple computing devices can be easily synchronized with each other with respect to content within the service provider network without unnecessary queries to the service provider network storage service. Additional details regarding the various components and processes described above for managing changes to stored content files and synchronizing the changes among multiple client devices will be presented below with regard to FIGS. 1A, 1B and 2.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances, and the like. As mentioned briefly above, the configurations described herein can be practiced in distributed computing environments, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

FIG. 1A illustrates a communication system 100 that includes a user 102. The user 102 owns and/or uses multiple client devices 104A-104N (which might be referred to herein singularly as "a client device 104" or in the plural as "the client devices 104") in the form of electronic devices such as, for example, smartphones, tablet computing devices, e-reader devices, or another type of computing device. In this regard, it should be appreciated that while the configurations disclosed herein are primarily presented in the context of portable computing devices such as a smartphone or tablet computing device, the configurations disclosed herein might also be utilized with other types of computing devices. For example, and without limitation, the configurations disclosed herein might be utilized with laptop computing devices, notebook computing devices, desktop computing devices, video game devices, set-top box devices, and other types of computing devices. The configurations disclosed herein should not be construed as being limited to a smartphone device or a tablet computing device, or a device from a particular manufacturer.

The client devices 104A-104N communicate via an appropriate network 106, such as the Internet, with a service provider network 108. The service provider network 108 can provide multiple services such as, for example, computing services, gaming, video services, audio services, storage services, etc. When providing storage services, the service provider network 108 can store various content or data 110 in the form of files for the user 102 in a storage service 112 that is in the form of some type of memory. Examples of content 110 that the user 102 can store in the storage service 112 include, for example, photographs, documents, videos, audio, etc. Generally, any type of data can be stored in the storage service 112.

In accordance with configurations, the service provider network 108 also includes a metadata data store 114 that stores metadata 116. The metadata 116 stored in the metadata data store 114 generally relates to the various content stored by the user 102 in the storage service 112. The metadata 116 can include, for example, a filename, a time/date stamp, location of the stored content 110, whether changes have been made to the stored content 110, information related to such changes, etc.

In accordance with configurations, a synchronization service 118 can be provided on the host computer 120 that can indicate whether content 110 has changed or updated in the storage service 112. In accordance with configurations, the synchronization service 118 maintains a negative cache as a part of its operation. As will be further described herein, the synchronization service 118 can be used to manage changes to content 110 stored in the storage service 112 and to synchronize the changes among the multiple client devices 104A-104N. The service provider network 108 also includes a host computer 120 for carrying out various functions described herein.

In accordance with configurations, when the user 102 utilizes a synchronization client 124 executing on one or more of the client devices 104A-104N, the client devices 104A-104N utilize a network services application programming interface (API) 126 that is exposed by the synchronization service 118 executing in the service provider network 108 in order to determine whether content stored on the client devices 104A-104N is up to date, or current, with respect to content 110 stored in the storage service 112. Such synchronization can include obtaining all current content 110 in the storage service 112 or obtaining only updated or changed content 110 from the storage service 112. The updated content 110 can include, for example, newly uploaded files, information relating to deleted files, renaming of files, etc.

In addition, in order to keep the various client devices 104A-104N up to date and synchronized with respect to the storage service 112 (and therefore with one another), the client devices 104A-104N can periodically utilize the network services API 126 to poll the synchronization service 118 for updated or changed content 110. The request for updated content 110 can be in the form of an authenticated call to access the storage service 112. For example, tokens included within the call can be utilized and decrypted by the service provider network 108 in order to authenticate and identify a particular client device 104 and the user's account with the service provider network 108.

In accordance with configurations, a corresponding checkpoint 122A-122N is generated by the synchronization service 118 and provided to the respective client devices 104A-104N once the respective client device 104A-104N has been updated and synchronized with respect to content 110 within the storage service 112. A copy of a checkpoint 122X is also stored within the synchronization service 118, as will be described in more detail herein. The checkpoints 122A-122N might be referred to herein singularly as "a checkpoint 122" or in the plural as "the checkpoints 122". When a client device 104 is turned on or activated, the client device 104 submits its current checkpoint 122 with a request 128 for any updated or changed content 110.

The checkpoints 122 are generally in the form of a timestamp that indicates the last point in time that a client device 104 has checked for updated or changed content 110. As long as no changes are made to the content 110 within the storage service 112, the checkpoint 122X remains stored within the synchronization service 118, e.g. in cache 130 within the synchronization service 118 or in a separate service accessible by the synchronization service 118. In configurations, when changes are made to content 110 within the storage service 112, the checkpoint 122X within the synchronization service 118 is removed from the cache 130 by the service provider network 108.

When requests 128 for an update are received by the synchronization service 118 from a requesting client device 104, for example client device 104A, the checkpoint 122A from the client device 104A is included in the request. The included checkpoint 122A is compared by the synchronization service 118 with the checkpoint 122X within the synchronization service 118. If the checkpoint 122X within the cache 130 is an older checkpoint with respect to the checkpoint 122A included in the update request, then the synchronization service 118 realizes that content 110 within the storage service 112 has not been modified.

In configurations, the checkpoint 122A from the requesting client device 104A is simply returned to the client device 104A by the synchronization service 118 to indicate that the client device 104A is up to date with respect to content 110. Alternatively, a new checkpoint 122A can be provided to the client device 104A or the checkpoint 122X in the synchronization service 118 can be provided to the client device 104A.

In configurations, when the checkpoint 122A that is included in the request of the client device 104A is older than the current checkpoint 122X in the cache 130, the synchronization service 118 determines whether changes have been made to the content 110 stored in the storage service 112 during the time period between the checkpoint 122A and the newer checkpoint 122X in the cache 130. In embodiments, the synchronization service 118 checks for changes to the content 110 by checking metadata 116 in the metadata store 114, where the metadata 116 is related to the content 110. In other embodiments, the synchronization service 118 checks for changes to the content 110 by checking the content 110 in the storage service 112. If no changes have been made to the content 110 during the time period between the checkpoint 122A provided by the requesting client device 104A and the checkpoint 122X in the cache 130, then the synchronization service 118 replaces the checkpoint 122X in the cache 130 with the older checkpoint 122A from the client device 104A.

However, if the content 110 has been changed or updated during the time period between the checkpoint 122A provided by the client device 104A and the newer checkpoint 122X in the cache 130, then the client device 104A can receive the changed or updated content 110 from the storage service 112. In alternative configurations, metadata 116 relating to the content 110 that has changed or been updated during the time period between the checkpoint 122A and the checkpoint 122X in the cache 130 is provided from the metadata data store 114 to the client device 104A.

Based upon the metadata 116, information can be provided by the client device 104A to the user 102 in order for the user 102 to determine if the changed or updated content at the storage service 112 should be retrieved. For example, if the changed or updated content 110 is in the form of new photos that have been uploaded to the storage service 112, the metadata 116 can include thumbnail prints for the user 102 to observe. If the user 102 determines that the changed or updated content should be added to client device 104A, then the changed or updated content 110 can be retrieved from the storage service 112. The client device 104A is provided with a new checkpoint 122A by the synchronization service and a copy of the new checkpoint 122A is stored as the checkpoint 122X within the cache 130.

As previously noted, when changes are made to content 110 within the storage service 112, the checkpoint 122X within the cache 130 is removed by the synchronization service 118. Thus, if a client device 104, for example client device 104A, requests an update and the cache 130 does not include a checkpoint 122X, then the synchronization service 118 knows that content 110 has been changed or updated and obtains the changed or updated content 110 from the storage service 112 or metadata 116 from the metadata data store 114 related to the changed or updated content 110 to provide to the client device 104A.

As also previously noted, based upon the metadata 116, information can be provided by the client device 104A to the user 102 in order for the user 102 to determine if the changed or updated content at the storage service 112 should be retrieved and provided to the client device 104A. For example, if the changed or updated content 110 is in the form of new photos that have been uploaded to the storage service 112, the metadata 116 can include thumbnail images for the user 102 to observe. The client device 104A is provided with a new checkpoint 122A by the host computer 120 and a copy of the new checkpoint 122A is stored as the checkpoint 122X within the cache 130.

In accordance with configurations, the client devices 104A-104N regularly poll the synchronization service 118 in order to synchronize the client devices 104A-104N to the most current content 110. However, in accordance with various configurations, the synchronization service 118 can send out push notification messages in response to changes in content 110.

For example, a checkpoint 122X can be stored in the cache 130. When a client device 104, for example client device 104A, makes changes to the content 110 stored in the storage service 112, the synchronization service 118 can remove the checkpoint 122X in the cache 130 and replace it with a new checkpoint 122X based upon the time that the content 110 was changed or updated. The new checkpoint 122X will also be provided to the client device 104A as a new checkpoint 122A. The synchronization service 118 sends out a push notification message to the client devices 104A-104N that are active to make an update call via the network services API 126. When the update call is made by the other active client devices 104B-104N that did not make changes to the content 110, the checkpoints 122B-122N, respectively, in those other client devices 104B-104N will be compared by the synchronization service 118 with the checkpoint 122X in the cache 130.

Since the checkpoints 122B-122N of the other active client devices will not match the new checkpoint 122X in the cache 130B, the changed or updated content 110, or the metadata 116 relating to the changed or updated content 110, is provided to the other active client devices 104B-104N. As previously noted, based upon the metadata 116, information can be provided by the other active client devices 104B-104N to the user 102 in order for the user 102 to determine if the changed or updated content 110 in the storage service 112 should be retrieved for one or more of the other active client devices 104B-104N.

For example, if the new content 110 is in the form of new photos that have been uploaded to the storage service 112, the metadata 116 can include thumbnail prints for the user 102 to observe. The other active client devices 104B-104N are now provided with the new checkpoint 122X that is in the cache 130. Upon making the update call, the client device 104A that made the changes provides the current checkpoint 122A, which will match the checkpoint 122X in the cache 130 upon comparison by the synchronization service 118. Thus, the changed or updated content 110, or the metadata 116 related to the changed or updated content 110, will not be provided to the client device 104A that made the changes to the content 110.

In accordance with various configurations, the checkpoints 122 and the synchronization service 118 can be utilized with hierarchal content storage arrangements. For example, and without limitation, checkpoints 122 can be provided for various folders and subfolders in the hierarchy and can be utilized in a manner similar to the manner previously described. Changes made to content in lower level subfolders will generally be rippled up to other folders and/or subfolders in the corresponding hierarchy.

In accordance with various configurations, application developers can specify that while developing applications or programs for execution by one or more of the computing devices 104A-104N in conjunction with the service provider network 108, the applications or programs under development should not compare checkpoints 122 with the synchronization service 118 when the applications or programs under development are submitted to the service provider network 108 for testing purposes. Additionally, application developers can develop applications or programs for execution by the computing devices 104A-104N in conjunction with the service provider network 108 wherein the applications or programs do not utilize checkpoints 122 in conjunction with the synchronization service 118 when the applications or programs are executed by a client device 104 in conjunction with the service provider network 108.

Figure 1B:
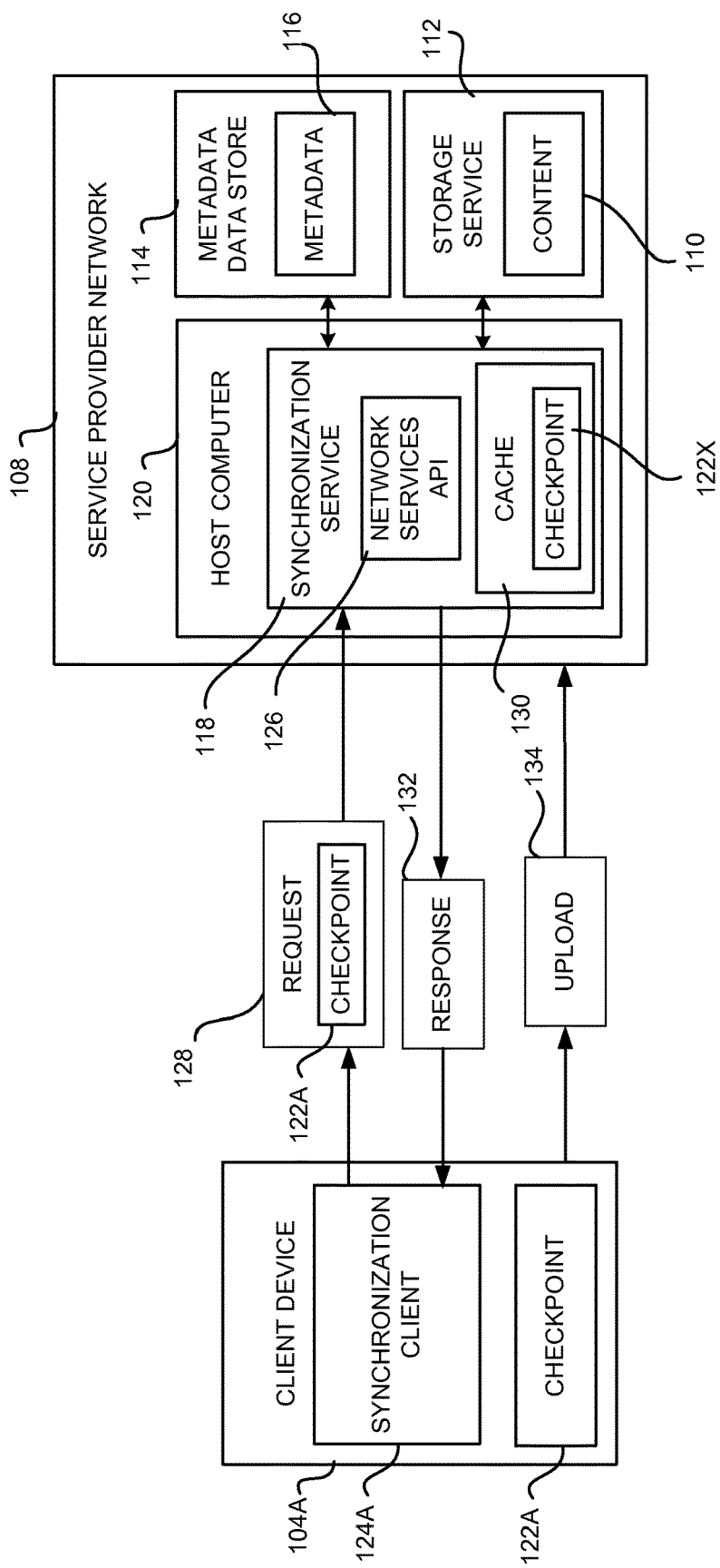
FIG. 1B is a partial network diagram showing communication between a computing device and a synchronization service within the network architecture of FIG. 1A.

FIG. 1B schematically illustrates communication between a computing device 104 and the synchronization service 118. For example, in FIG. 1B, computing device 104A sends a request 128A utilizing the synchronization client 124A on the computing device 104A to the synchronization service 118 in the service provider network 108. The request 128 includes the current checkpoint 122A on the computing device 104A. As previously discussed, the synchronization service 118 checks to see if there is a checkpoint 122X in the cache 130. If there is a checkpoint 122X in the cache 130, then the synchronization service 118 compares the checkpoint 122X with the checkpoint 122A. If the checkpoint 122X is older than the checkpoint 122A, then a response 132 from the synchronization service 118 is forwarded from the synchronization service 118 to the synchronization client 124A on the computing device 104A.

The response 132 can include the checkpoint 122A. Alternatively, the response 132 can include the checkpoint 122X or a completely new checkpoint. The response 132 indicates to the computing device 104A that there is no changed or updated content 110 in the storage service 112. If the checkpoint 122A is older than the checkpoint 122X, then the synchronization service 118 checks to see if content 110 stored in the storage service 112 has been changed or updated between the time period of the checkpoint 122A and the checkpoint 122X. As previously noted, in embodiments, the synchronization service 118 checks for changes to the content 110 by checking metadata 116 in the metadata store 114, where the metadata 116 is related to the content 110. In other embodiments, the synchronization service 118 checks for changes to the content 110 by checking the content 110 in the storage service 112.

If the content 110 has not been changed or updated during the time period, then the checkpoint 122X is replaced in the cache 130 with the supplied checkpoint 122A from the computing device 104A. If changes have been made to the content 110 in the storage service 112 (or if there is no checkpoint 122X in the cache 130), then metadata 116 can be retrieved by the synchronization service 118 and forwarded to the synchronization client 124A in the response 132. The metadata 116 relates to the changed or updated content 110 and thus, the user 102 of the computing device 104A, or the computing device 104A itself, can determine whether the changed or updated content is desired.

If the changed or updated content is desired, then another request (that does not include the checkpoint 122A) can be sent from the synchronization client 124A to the synchronization service 118 requesting the changed or updated content 110 from the storage service 112. The synchronization service 118 can retrieve the changed or updated content 110 from the storage service 112 and forward the changed or updated content to the synchronization client 124A in another response 132. Alternatively, the metadata 116 can include, for example, the location of the changed or updated content 110 and the client device 104A can request the changed or updated content 110 directly from the storage service 112.

A new checkpoint 122 can then be generated by the synchronization service 118 and stored in the cache 130 as a new checkpoint 122X. The new checkpoint can also be provided in a new or previous response 132 to the synchronization client 124A, which can then store the new checkpoint 122A on the computing device 104A.

As previously noted, as long as no changes are made to the content 110 within the storage service 112, the checkpoint 122X remains stored within the synchronization service 118, e.g. in cache 130 within the synchronization service 118 or in a separate service accessible by the synchronization service 118. In configurations, when changes are made to content 110 within the storage service 112, the checkpoint 122X within the synchronization service 118 is removed from the cache 130 by the service provider network 108. For example, if the client device 104A provides new photographs in an upload 134 to the service provider network 108 for content 110 within the storage service 118, the checkpoint 122X within the synchronization service 118 is removed or erased from the cache 130 by the service provider network 108. In embodiments, the synchronization service 118 removes the checkpoint 122X from the cache 130.

Figure 2:
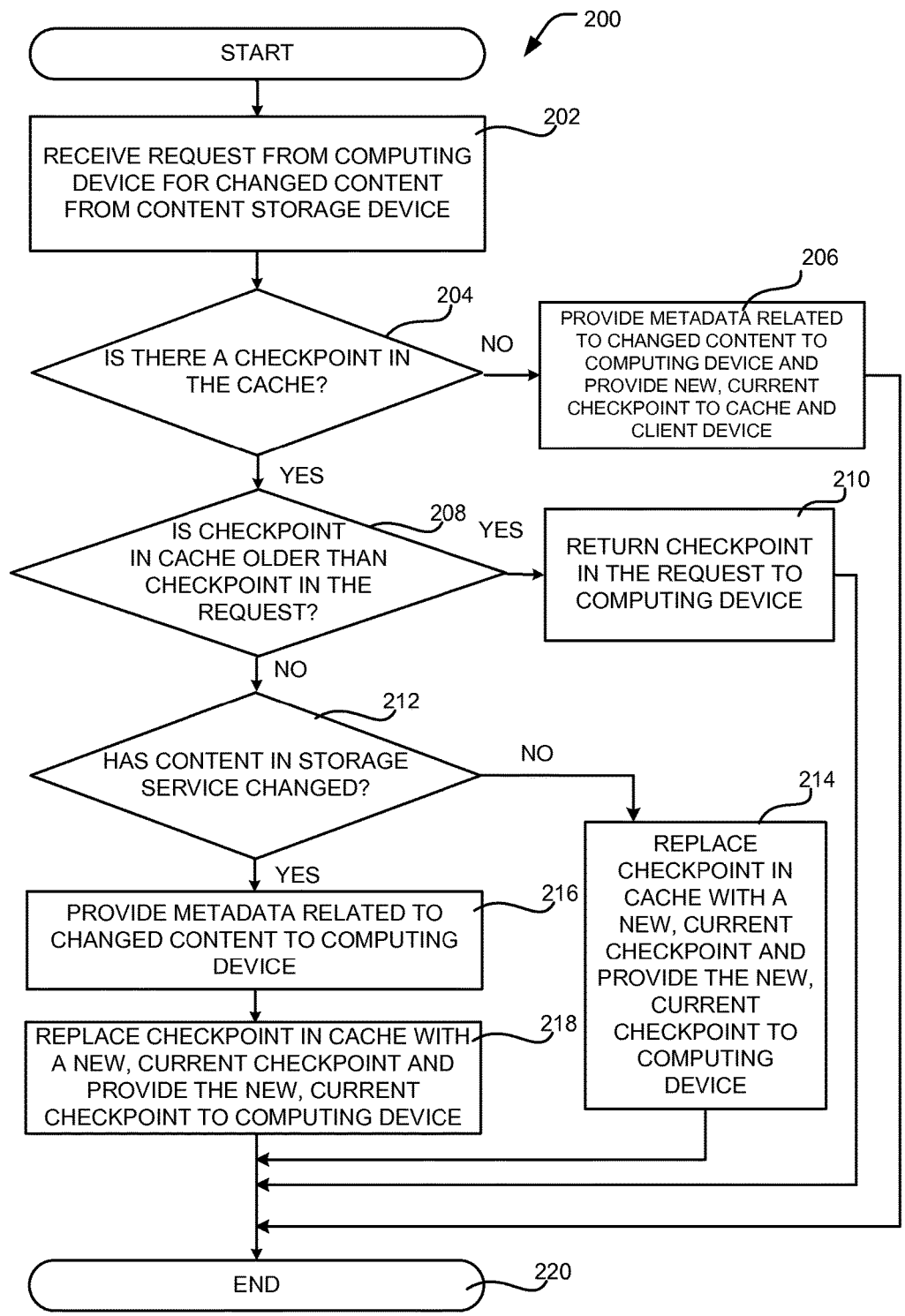
FIG. 2 is flow diagram showing aspects of the operation of components in a service provider network for managing changes to stored content files and synchronizing the changes among multiple client devices, according to configurations disclosed herein.

FIG. 2 is a flow diagram showing one illustrative routine 200 that illustrates aspects of the operation of components in a service provider network 108 for managing changes to stored content 110 and synchronizing the changes among multiple client devices 104, according to one configuration disclosed herein. It should be appreciated that the logical operations described herein with respect to FIG. 2, and the other FIGS., can be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations can be performed than shown in the FIGS. and described herein. These operations can also be performed in parallel, or in a different order than those described herein.

The routine 200 begins at operation 302, where the synchronization service 118 receives a request from a client device 104 for changed or updated content 110 from the storage service 112. In response to receiving a request, at operation 204 the synchronization service 118 checks to see if the cache 128 of the service 118 has a checkpoint 122X stored therein.

If there is not a checkpoint 122X stored in the cache 128, then at operation 206 metadata 116 the changed or updated content 110 is provided to the requesting client device 104. The requesting client device 104, based upon the metadata 116, can request the changed or updated content 110, if desired, through the synchronization service 118 or directly from the storage service 112. The metadata 116 can include, for example, the network location of the changed or updated content. A new, current checkpoint 122 is then generated by the synchronization service 118, stored in the cache 128 and provided to the requesting client device 104.

If there is a checkpoint 122X stored in the cache 128, then at operation 208 the synchronization service 118 of the service provider network 108 compares the checkpoint 122X with a checkpoint 122 included in the request from the client device 104 to see if the checkpoint 122X is older than the checkpoint 122 in the request. If the checkpoint 122X is older than the checkpoint 122 in the request, then at operation 210 the synchronization service 118 returns the checkpoint 122 included in the request to the requesting client device 104. If the checkpoint 122X is not older than the checkpoint 122 in the request, then at operation 212 the synchronization service 118 checks to see if content 110 has changed or updated in the storage service 112.

If the content 110 has not changed or been updated, then at operation 214 a new, current checkpoint 122 is generated by the synchronization service 118 and stored in the cache 128 to become the new checkpoint 122X. The new, current checkpoint 122 is also provided to the requesting client device 104 by the synchronization service 118.

If the content 110 has changed or been updated, then at operation 216 metadata 116 describing the changed or updated content is retrieved by the synchronization service 118 from the metadata storage device 114 and provided to the requesting client device 104. At operation 218, a new, current checkpoint 122 is generated by the synchronization service 118 and stored in the cache 128 to become the new checkpoint 122X. The new, current checkpoint 122 is also provided to the requesting client device 104 by the synchronization service 118. From operation 218, the routine 200 proceeds to operation 220 where it ends.

Figure 3:
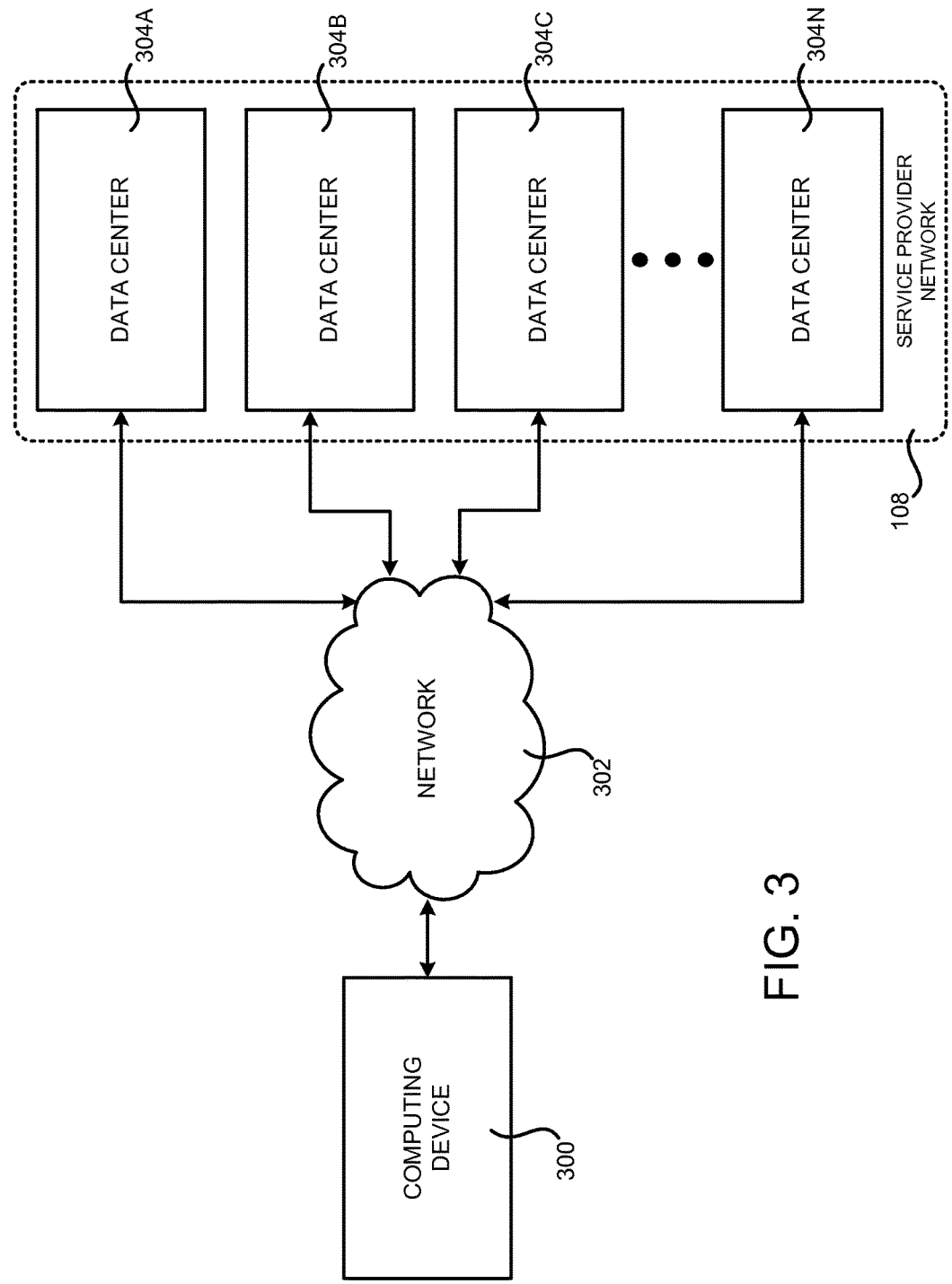
FIG. 3 is a system and network diagram that shows an illustrative operating environment that includes a service provider network that can be configured to implement aspects of the functionality described herein.

FIG. 3 is a system and network diagram that shows one illustrative operating environment for the configurations disclosed herein that includes a service provider network 108 that can be configured to manage and store content 110 as described above, according to one configuration disclosed herein. The service provider network 108 can provide computing resources on a permanent or an as-needed basis. Among other types of functionality, the computing resources provided by the service provider network 108 can be utilized to execute the various services described above. The computing resources provided by the service provider network 108 can include various types of computing resources, such as data processing resources, data storage resources, networking resources, data communication resources, network services, and the like.

Each type of computing resource provided by the service provider network 108 can be general-purpose or can be available in a number of specific configurations. For example, data processing resources can be available as physical computers or virtual machine instances in a number of different configurations. The virtual machine instances can be configured to execute applications, including Web servers, application servers, media servers, data store servers, some or all of the services described above, and/or other types of programs. Data storage resources can include file storage devices, block storage devices, and the like. The service provider network 108 might also be configured to provide other types of resources and network services.

The computing resources provided by the service provider network 108 are enabled in one implementation by one or more data centers 304A-304N (which might be referred to herein singularly as "a data center 304" or in the plural as "the data centers 304"). The data centers 304 are facilities utilized to house and operate computer systems and associated components. The data centers 304 typically include redundant and backup power, communications, cooling, and security systems. The data centers 304 might also be located in geographically disparate locations. One illustrative configuration for a data center 304 that implements some of the technologies disclosed herein is for managing changes to stored content 110 and synchronizing the changes among multiple client devices 104 will be described below with regard to FIG. 3.

The customers and other users of the service provider network 108 can access the computing resources provided by the service provider network 108 over a network 302, which can be a wide area communication network ("WAN"), such as the Internet, an intranet or an Internet service provider ("ISP") network or a combination of such networks. For example, and without limitation, a computing device 300 operated by a customer or other user of the service provider network 108 might be utilized to access the service provider network 108 by way of the network 302. It should be appreciated that a local-area network ("LAN"), the Internet, or any other networking topology known in the art that connects the data centers 304 to remote customers and other users can be utilized. It should also be appreciated that combinations of such networks might also be utilized.

Figure 4:
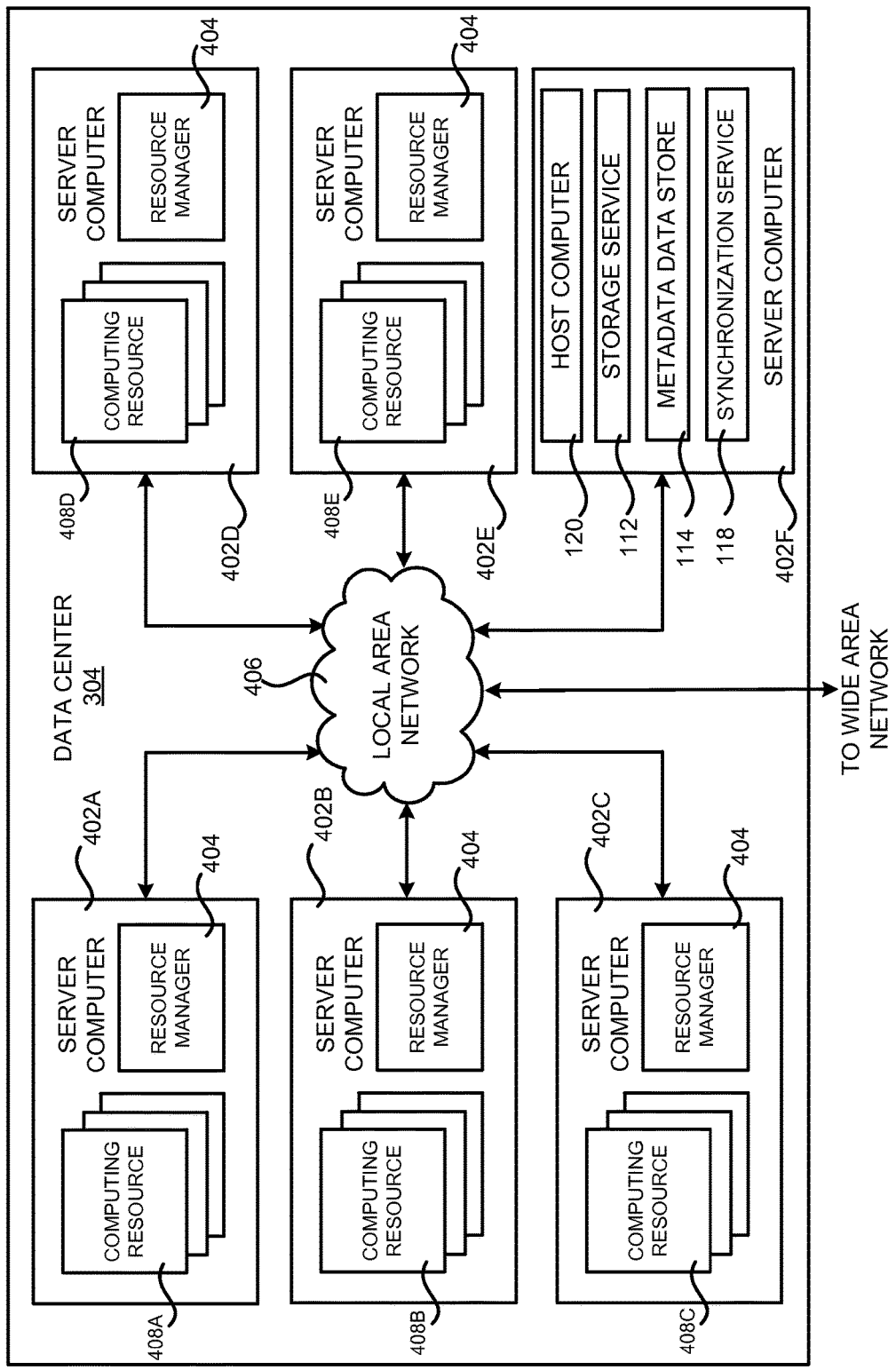
FIG. 4 is a computing system diagram that illustrates a configuration for a data center that can be utilized to implement aspects of the technologies disclosed herein.

FIG. 4 is a computing system diagram that illustrates one configuration for a data center 304 that implements aspects of the concepts and technologies disclosed herein for managing and storing of content 110. The example data center 304 shown in FIG. 4 includes several server computers 402A-402F (which might be referred to herein singularly as "a server computer 402" or in the plural as "the server computers 402") for providing computing resources 408A-408E.

The server computers 402 can be standard tower, rackmount, or blade server computers configured appropriately for providing the computing resources described herein. As mentioned above, the computing resources might be data processing resources such as virtual machine instances or hardware computing systems, data storage resources, data store resources, networking resources, and others. Some of the servers 402 might also be configured to execute a resource manager 404 capable of instantiating and/or managing the computing resources. In the case of virtual machine instances, for example, the resource manager 404 might be a hypervisor or another type of program configured to enable the execution of multiple virtual machine instances on a single server 402. Server computers 402 in the data center 404 might also be configured to provide network services and other types of services, some of which are described in detail below with regard to FIG. 4.

The data center 304 shown in FIG. 4 also includes a server computer 402F that can execute some or all of the software components described above. For example, and without limitation, the server computer 402F might be configured as the host computer 120, which has been described in detail above. The server computer 502F might also be configured to execute other components, e.g., synchronization service 118, and/or to store data, e.g., content 110 and/or metadata 116, for providing some or all of the functionality described herein. In this regard, it should be appreciated that the services illustrated in FIG. 4 as executing on the server computer 402F might execute on many other physical or virtual servers in the data centers 304 in various configurations.

In the example data center 304 shown in FIG. 4, an appropriate LAN 406 is also utilized to interconnect the server computers 402A-402F. The LAN 406 is also connected to the network 302 illustrated in FIG. 3. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components might also be utilized for balancing a load between each of the data centers 304A-304N, between each of the server computers 402A-402F in each data center 304, and, potentially, between computing resources in each of the data centers 304. It should be appreciated that the configuration of the data center 304 described with reference to FIG. 4 is merely illustrative and that other implementations might be utilized.

Figure 5:
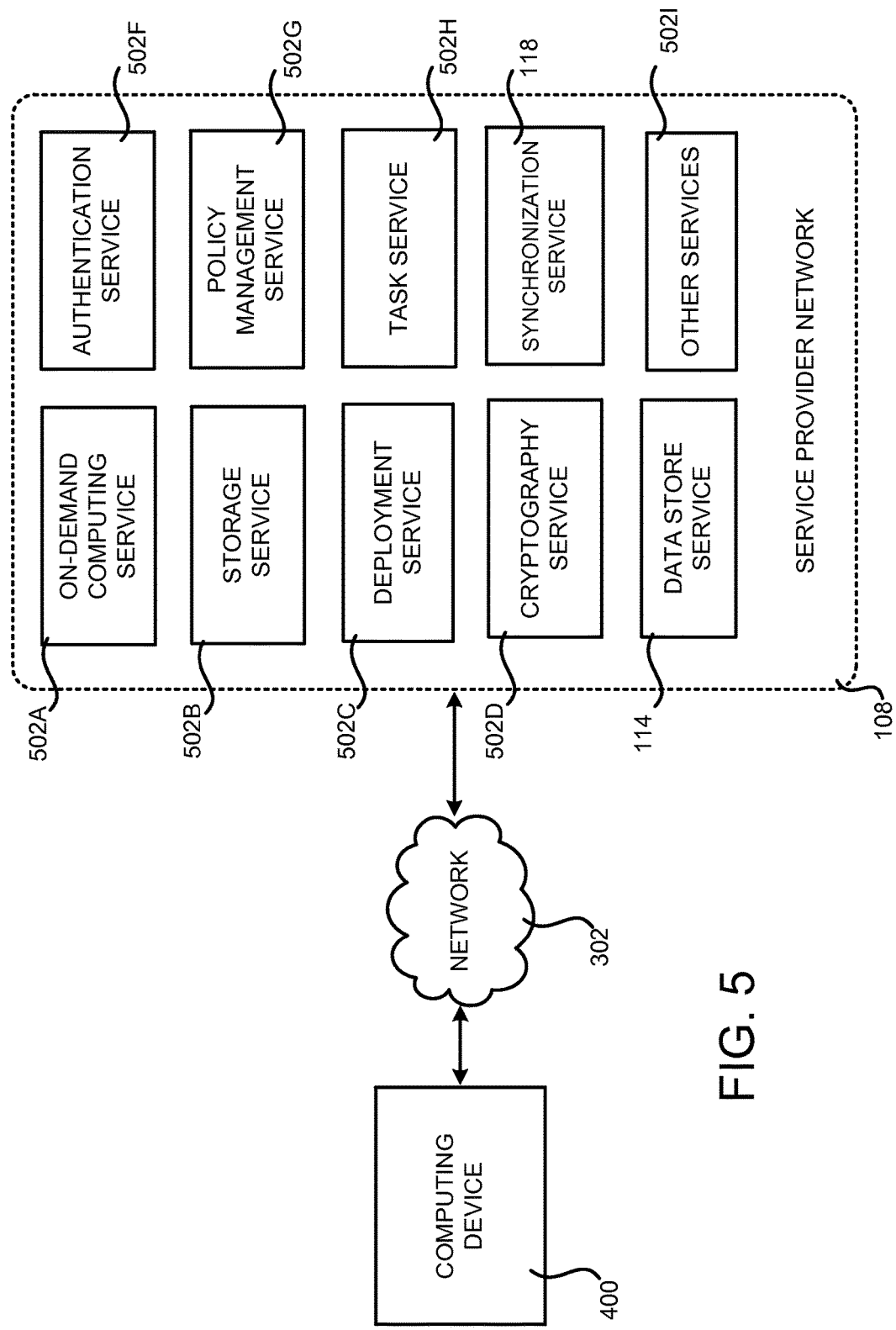
FIG. 5 is a system and network diagram that shows aspects of several services that might be provided by and utilized within a service provider network in one configuration disclosed herein.

FIG. 5 is a system and network diagram that shows aspects of several network services that might be provided by and utilized within a service provider network 108 in one configuration disclosed herein. In particular, and as discussed briefly above, the service provider network 108 can provide a variety of network services to customers and other users of the service provider network 108 including, but not limited to, an on-demand computing service 502A, a storage service 502B (e.g., storage service 112), a deployment service 502C, a cryptography service 502D, an authentication service 502F, a policy management service 502G, and/or a task service 502H, each of which is described in greater detail below. Additionally, the service provider network 108 can also provide the host computer 120, the metadata data store 114 and/or the synchronization service 118, each of which was described in detail above. The service provider network 108 might also provide other services 502I, some of which are described in greater detail below.

It should be appreciated that customers of the service provider network 108 can include organizations or individuals that utilize some or all of the services provided by the service provider network 108. As shown in FIG. 5, a customer or other user can communicate with the service provider network 108 through the network 302. Communications from the computing device 400 to the service provider network 108 can cause the services provided by the service provider network 108 to operate in accordance with the described configurations or variations thereof.

It is noted that not all configurations described include the services described with reference to FIG. 5 and that additional services can be provided in addition to or as an alternative to services explicitly described. Each of the services shown in FIG. 5 might also expose web service interfaces that enable a caller to submit appropriately configured API calls to the various services through web service requests. In addition, each of the services can include service interfaces that enable the services to access each other (e.g., to enable a virtual computer system provided by the on-demand computing service 502A to store data in or retrieve data from the data storage service 502B). Additional details regarding some of the services shown in FIG. 5 will now be provided.

The on-demand computing service 502A can be a collection of computing resources configured to instantiate virtual machine instances. For example, a customer or other user of the service provider network 502A can interact with the on-demand computing service 502A (via appropriately configured and authenticated API calls) to provision and operate virtual computer systems that are instantiated on physical computing devices hosted and operated by the service provider network 102. The virtual computer systems can be used for various purposes, such as to operate as servers supporting a website, to operate business applications or, generally, to serve as computing resources for the customer. Other applications for the virtual computer systems can be to support data store applications, electronic commerce applications, business applications and/or other applications. Although the on-demand computing service 502A is shown in FIG. 5, any other computer system or computer system service can be utilized in the service provider network 108, such as a computer system or computer system service that does not employ virtualization and instead provisions computing resources on dedicated or shared computers/servers and/or other physical devices.

In some configurations, the on-demand computing service 502A is configured to provide clusters of computing resources. For example, and without limitation, the on-demand computing service 502A might provide clusters of virtual or physical hosts for executing services such as those described above. According to one configuration, computing clusters provided by the on-demand computing service 502A might be organized as an APACHE™ HADOOP® computing cluster specialized for deployment alongside, or within, the service provider network 108. It should be appreciated that other variations and implementations of computing clusters are possible. Thus, the present disclosure should not be limited to only these examples, but should be interpreted as including any equivalent variations as well.

The storage service 502B might include software and computing resources that collectively operate to store data using block or file-level storage devices (and/or virtualizations thereof). The storage devices of the storage service 502B might, for instance, be operationally attached to virtual computer systems provided by the on-demand computing service 502A to serve as logical units (e.g., virtual drives) for the computer systems. A storage device might also enable the persistent storage of data used/generated by a corresponding virtual computer system where the virtual computer system service might only provide ephemeral data storage.

The service provider network 108 can also include a cryptography service 502D. The cryptography service 502D can utilize storage services of the service provider network 108, such as the storage service 502B, to store encryption keys in encrypted form, whereby the keys are usable to decrypt customer keys accessible only to particular devices of the cryptography service 502D. The cryptography service 502D might also provide other types of functionality not specifically mentioned herein.

As illustrated in FIG. 5, the service provider network 108, in various configurations, also includes an authentication service 502F and a policy management service 502G. The authentication service 502F, in one example, is a computer system (i.e., collection of computing resources) configured to perform operations involved in authentication of users. For instance, one of the services 502 shown in FIG. 5 can provide information from a user to the authentication service 502F to receive information in return that indicates whether the requests submitted by the user are authentic.

The policy management service 502G, in one example, is a network service configured to manage policies on behalf of customers or internal users of the service provider network 108. The policy management service 502G can include an interface that enables customers to submit requests related to the management of policy. Such requests can, for instance, be requests to add, delete, change or otherwise modify policy for a customer, service, or system, or for other administrative actions, such as providing an inventory of existing policies and the like.

The service provider network 108, in various configurations, is also configured with a task service 502H. The task service 502H is configured to receive a task package and to enable executing tasks as dictated by the task package. The task service 502H can be configured to use any resource of the service provider network 108, such as instantiated virtual machines or virtual hosts, for executing the task. The task service 502H can configure the instantiated virtual machines or virtual hosts to operate using a selected operating system and/or a selected execution application in accordance with specified requirements.

The service provider network 108 can also maintain, for example, the host computer 120, storage service 112, the metadata storage device 114 and/or the synchronization service 118, in various configurations. As previously noted, the host computer 120 checks the synchronization service to see if the synchronization service includes a checkpoint 122X. The host computer 120 compares the checkpoint 122X with other checkpoints 122A-122N in order to determine if changed or updated content 110 and/or metadata 116 related thereto should be provided from the storage service 112 and/or the metadata storage device 114, respectively, to any of the client devices 104A-104N.

The service provider network 102 can additionally maintain other services 502 based, at least in part, on the needs of its customers. For instance, the service provider network 108 can maintain a deployment service 502C for deploying program code and/or a data store service (not shown in FIG. 5) in some configurations. A data store service can be a collection of computing resources that collectively operate to create, maintain, and allow queries to be performed on data stores stored within the service provider network 108. For example, a customer or other user of the service provider network 108 can operate and manage a data store from the data store service by utilizing appropriately configured network API calls. This, in turn, can allow the customer to maintain and potentially scale the operations in the data store. Other services include object-level archival data storage services, and services that manage, monitor, interact with, or support other services. The service provider network 108 might also be configured with other services not specifically mentioned herein in other configurations.

Figure 6:
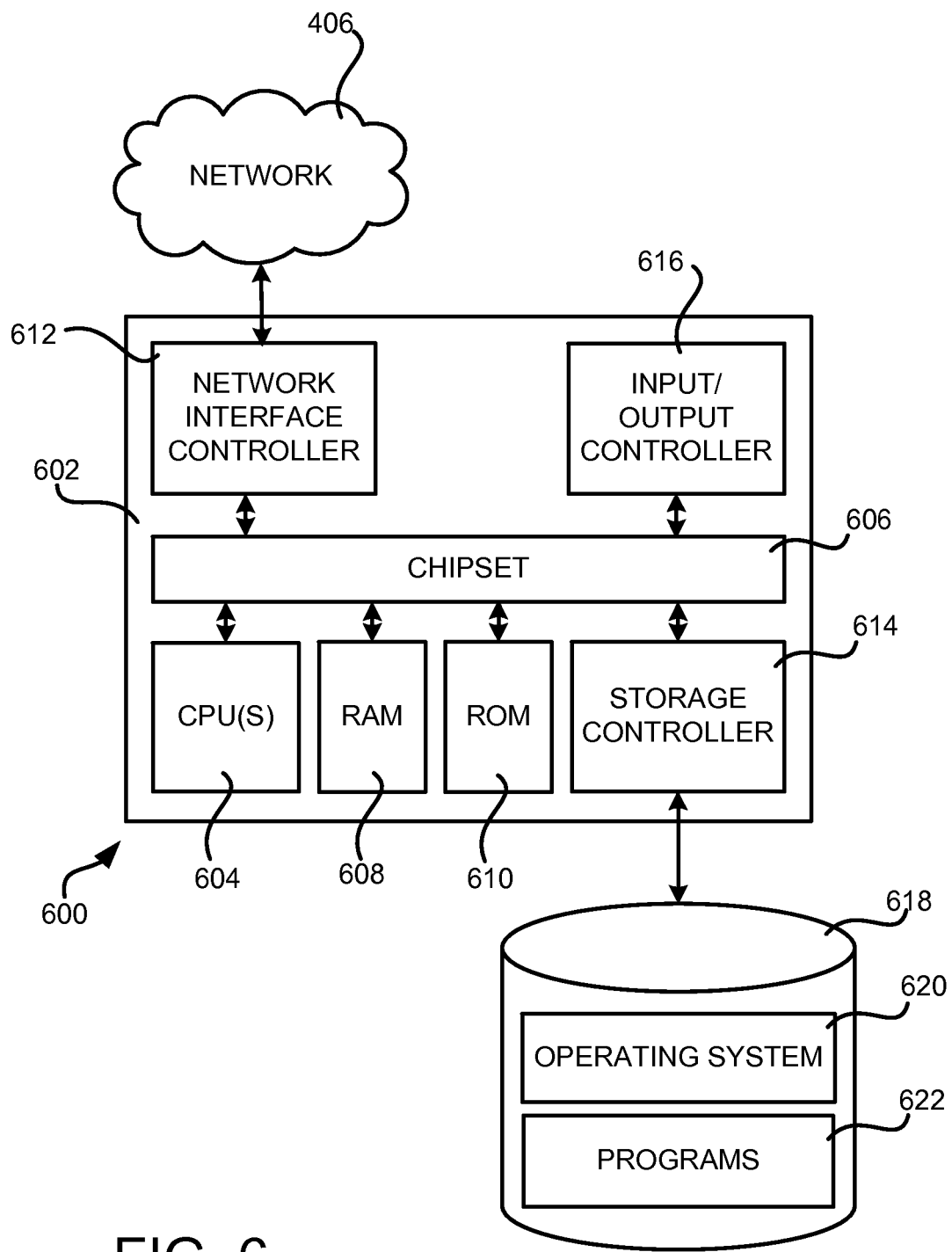
FIG. 6 is a computer architecture diagram showing an illustrative computer hardware architecture for implementing a computing device that might be utilized to implement aspects of the various technologies presented herein.

FIG. 6 shows an example computer architecture for a computer 600 capable of executing program components for implementing various aspects of the functionality described above. The computer architecture shown in FIG. 6 illustrates a conventional server computer, workstation, desktop computer, laptop, tablet, network appliance, e-reader, smartphone, or other computing device, and can be utilized to execute any of the software components presented herein. For example, the computer architecture shown in FIG. 6 can be utilized to execute software components for managing changes to stored content 110 and synchronizing the changes among multiple client devices 104 in the manner described above.

The computer 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computer 600.

The CPUs 604 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computer 600. The chipset 606 can further provide an interface to a computer-readable storage medium such as a read-only memory ("ROM") 610 or non-volatile RAM ("NVRAM") for storing basic routines that help to startup the computer 600 and to transfer information between the various components and devices. The ROM 610 or NVRAM can also store other software components necessary for the operation of the computer 600 in accordance with the configurations described herein.

The computer 600 can operate in a networked environment using logical connections to remote computing devices and computer systems through a network, such as the network 406. The chipset 606 can include functionality for providing network connectivity through a NIC 612, such as a gigabit Ethernet adapter. The NIC 612 is capable of connecting the computer 600 to other computing devices over the network 406. It should be appreciated that multiple NICs 612 can be present in the computer 600, connecting the computer to other types of networks and remote computer systems.

The computer 600 can be connected to a mass storage device 618 that provides non-volatile storage for the computer. The mass storage device 618 can store an operating system 620, programs 622, and data, which have been described in greater detail herein. The mass storage device 618 can be connected to the computer 600 through a storage controller 614 connected to the chipset 606. The mass storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 600 can store data on the mass storage device 618 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 618 is characterized as primary or secondary storage, and the like.

For example, the computer 600 can store information to the mass storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 can further read information from the mass storage device 618 by detecting the physical states or characteristics of one or more particular locations within the physical storage units.

In addition to the mass storage device 618 described above, the computer 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 600.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 618 can store an operating system 620 utilized to control the operation of the computer 600. According to one configuration, the operating system comprises the LINUX operating system. According to another configuration, the operating system comprises the WINDOWS® SERVER operating system from MICROSOFT Corporation. According to further configurations, the operating system can comprise the UNIX operating system or one of its variants. It should be appreciated that other operating systems can also be utilized. The mass storage device 618 can store other system or application programs and data utilized by the computer 600.

In one configuration, the mass storage device 618 or other computer-readable storage media is encoded with computer-executable instructions which, when loaded into the computer 600, allow the computer to perform the configurations described herein. These computer-executable instructions transform the computer 600 by specifying how the CPUs 604 transition between states, as described above. According to one configuration, the computer 600 has access to computer-readable storage media storing computer-executable instructions which, when executed by the computer 600, perform the various processes described above with regard to FIGS. 1 and 2. The computer 600 might also include computer-readable storage media for performing any of the other computer-implemented operations described herein.

The computer 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, a plotter, or other type of output device. It will be appreciated that the computer 600 might not include all of the components shown in FIG. 6, can include other components that are not explicitly shown in FIG. 6, or can utilize an architecture completely different than that shown in FIG. 6

Based on the foregoing, it should be appreciated that technologies for implementing a network-based system for managing changes to stored content files and synchronizing the changes among multiple client devices have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A computer-implemented method for synchronizing a plurality of client devices with respect to content stored in a service provider network, wherein the plurality of client devices is associated with a user of the service provider network, the method comprising performing computer-implemented operations for:
   receiving a request from a first client device of the plurality of client devices to determine if content stored within the service provider network has been updated;
   checking a synchronization service of the service provider network to determine if a first checkpoint is stored within the synchronization service;
   checking for updated content stored within the service provider network if the first checkpoint is not stored within the synchronization service;
   comparing a second checkpoint included within the request with the first checkpoint if the first checkpoint is stored within the synchronization service;
   checking for the updated content stored within the service provider network if the second checkpoint is older than the first checkpoint;
   providing data to the first client device if the updated content is stored within the service provider network;
   generating a third checkpoint if the data is provided to the first client device;
   providing the third checkpoint to the first client device to replace the second checkpoint; and
   replacing the first checkpoint with the third checkpoint in the synchronization service.

2. The computer-implemented method of claim 1, further comprising:
   returning the second checkpoint to the first client device if the content has not been updated; and
   replacing the first checkpoint with the second checkpoint in the synchronization service.

3. The computer-implemented method of claim 1, further comprising:
   removing the first checkpoint from the synchronization service in response to one of the client devices of the plurality of client devices changing content in the service provider network.

4. The computer-implemented method of claim 1, wherein providing data to the first client device comprises providing metadata related to the updated content.

5. The computer-implemented method of claim 1, wherein providing data to the first client device comprises the updated content.

6. A computer-readable storage medium having computer-executable instructions stored thereupon which, when executed by a computer at a service provider network, cause the computer to:
   receive a request from a client device to determine if content stored within the service provider network has been updated, wherein the client device is one of a plurality of client devices;
   check a synchronization service to determine if a first checkpoint is stored within the service provider network;
   check for updated content stored within the service provider network if the first checkpoint is not stored within the synchronization service;
   compare a second checkpoint included within the request with the first checkpoint if the first checkpoint is stored within the synchronization service;
   check for the updated content stored within the service provider network if the second checkpoint is older than the first checkpoint;
   provide data to the client device if the updated content is stored within the service provider network; and
   replace the first checkpoint and the second checkpoint with a third checkpoint if the data is provided to the client device.

7. The computer-readable storage medium of claim 6, wherein the data comprises metadata related to the updated content.

8. The computer-readable storage medium of claim 6, wherein the data comprises the updated content.

9. The computer-readable storage medium of claim 6, having further computer-executable instructions stored thereupon to:
   generate the third checkpoint; and
   provide the third checkpoint to the client device.

10. The computer-readable storage medium of claim 6, having further computer-executable instructions stored thereupon to:
    remove the first checkpoint from the synchronization service in response to one of the client devices of the plurality of client devices changing content in the service provider network.

11. The computer-readable storage medium of claim 6, having further computer-executable instructions stored thereupon to:
    return the second checkpoint to the client device if the updated content is not stored within the service provider network; and
    replace the first checkpoint with the second checkpoint in the synchronization service.

12. The computer-readable storage medium of claim 6, having further computer-executable instructions stored thereupon:
    return the second checkpoint to the client device if the first checkpoint is older than the second checkpoint.

13. The computer-readable storage medium of claim 6, wherein the synchronization service comprises a cache.

14. A computer-implemented method for synchronizing a plurality of client devices with respect to content stored in a service provider network, the method comprising performing computer-implemented operations for:
    receiving a request from a first client device of the plurality of client devices to determine if content stored within the service provider network has been updated;
    checking a synchronization service of the service provider network to determine if a first checkpoint is stored within the service provider network;

checking for updated content stored within the service provider network if the first checkpoint is not stored within the synchronization service;

comparing a second checkpoint included within the request with the first checkpoint if the first checkpoint is stored within the synchronization service;

checking for the updated content stored within the service provider network if the second checkpoint is older than the first checkpoint;

providing data to the first client device if the updated content is stored within the service provider network; and replacing the first checkpoint and the second checkpoint with a third checkpoint if the data is provided to the first client device.

15. The computer-implemented method of claim 14, wherein providing the data to the first client device comprises providing metadata related to the updated content.

16. The computer-implemented method of claim 14, wherein providing the data to the first client device comprises providing the updated content.

17. The computer-implemented method of claim 14, further comprising:

generating the third checkpoint; and providing the third checkpoint to the first client device.

18. The computer-implemented method of claim 14, further comprising:

removing the first checkpoint from the synchronization service in response to one of the client devices of the plurality of client devices changing content in the service provider network.

19. The computer-implemented method of claim 14, further comprising:

returning the second checkpoint to the first client device if the updated content is not stored within the service provider network; and replacing the first checkpoint with the second checkpoint in the synchronization service.

20. The computer-implemented method of claim 14, further comprising:

returning the second checkpoint to the first client device if the first checkpoint is older than the second checkpoint.

* * * * *